(12) United States Patent
Miller (10) Patent No.: US 6,421,928 B1
(45) Date of Patent: Jul. 23, 2002

(54) DEVICE FOR LOCATING ATTACHMENT POINTS

(76) Inventor: Garold C. Miller, 47 Cardinal Dr., Glastonbury, CT (US) 06033

( * ) Notice: Subject to any disclaimer, the term of this patent is extended or adjusted under 35 U.S.C. 154(b) by 0 days.

(21) Appl. No.: 09/590,908

(22) Filed: Jun. 9, 2000

Related U.S. Application Data (60) Provisional application No. 60/138,197, filed on Jun. 9, 1999.

(51) Int. Cl.$^7$ ................................................. B25H 7/04
(52) U.S. Cl. ............................. 33/520; 33/613; 33/669
(58) Field of Search ......................... 33/520, 452, 464, 33/483, 484, 486, 487, 494, 533, 613, 644, 645, 562

(56) References Cited

U.S. PATENT DOCUMENTS

| | | | |
|---|---|---|---|
| 41,005 A | 12/1863 | Hervey | |
| 564,342 A | 7/1896 | Sherman | |
| 1,043,902 A | 11/1912 | Burdick | |
| 3,483,631 A | * 12/1969 | Bourgeois | .................... 33/645 |
| 3,516,165 A | 6/1970 | Pfeffer | .......................... 33/520 |
| 3,628,253 A | * 12/1971 | Shepard | ...................... 33/520 |
| 4,241,510 A | * 12/1980 | Radecki | ....................... 33/613 |
| 4,700,489 A | 10/1987 | Vasile | |
| 4,837,942 A | 6/1989 | Watts | |
| 4,893,776 A | 1/1990 | Floyd | |
| 5,103,573 A | 4/1992 | Ehling et al. | .................. 33/613 |
| 5,129,154 A | 7/1992 | Aydelott | |
| 5,189,804 A | * 3/1993 | Ostachowski | ................ 33/494 |
| 5,353,509 A | 10/1994 | Black | |
| 5,459,935 A | 10/1995 | Paulson et al. | |
| 5,713,135 A | 2/1998 | Acopulos | |
| 5,867,917 A | 2/1999 | Karon | .......................... 33/613 |
| 6,029,362 A | * 2/2000 | Miodragovic | ................ 33/483 |

* cited by examiner

*Primary Examiner*—Christopher W. Fulton
(74) *Attorney, Agent, or Firm*—Cummings & Lockwood (57) ABSTRACT

A locating device for attaching a fixture level on a wall is disclosed. The device includes an elongated body having a rear side. A first trammel is slidingly mounted on the elongated body and includes a first marker extending from the first trammel in a direction away from the rear side of the body. A second trammel is also slidingly mounted on the elongated body and includes a second marker extending from the second trammel in a direction away from the rear side of the body. A first securing device is attached to the first trammel to secure it in a desired position. A second securing device is attached to the second trammel to secure it in a desired position. A level is mounted to the elongated body and has a predetermined orientation relative to an imaginary line connecting the first marker and the second marker. A side of the elongated body may include graduated markings which can be used as a guide to position the trammels.

15 Claims, 6 Drawing Sheets

DEVICE FOR LOCATING ATTACHMENT POINTS

RELATED APPLICATION

This application claims priority of U.S. Provisional Patent Application No. 60/138,197, filed on Jun. 9, 1999, the disclosure of which is herein incorporated by reference.

BACKGROUND OF THE INVENTION

1. Field of the Invention

The subject invention relates generally to a device for attaching a fixture on a wall, and, more particularly, to an device for gauging the distance between attachment points on a fixture and transferring the attachment points to a desired location on a wall so that the fixture will hang level.

2. Background of the Related Art

Those that have ever attempted to hang a picture frame on a wall are well aware of the difficulty in locating the hook in the right position on the wall so the picture frame hangs exactly where desired. Typically, the picture frame is positioned on the wall and a location for the hook is approximated. Various creative solutions are employed involving using geometric acrobatics with a tape measure, paper and pencil, however, the results are usually less than satisfactory.

A number of devices have been devised for simplifying the task of hanging picture frames. For example, U.S. Pat. No. 5,867,917 to Karon discloses a picture hanging locating device for use with a picture frame having a hanging wire. The device is configured at its first end for gripping an upper peripheral edge of the picture frame and configured at its second end for hooking the hanging wire. The second end is drawn toward the first end by a mechanism in the first end, thereby applying tension to the hanging wire. A marking pin is secured to the second end facing away from the rear of the picture frame and toward the wall. The marking pin is used for marking a location on the wall where a hook should be placed to engage the wire when the picture frame is hung on the wall.

In another example, U.S. Pat. No. 5,129,154 to Aydelott discloses a device similar to the Karon device. The Aydelott device includes two major components: an elongated rigid handle member for grasping the device and an elongated rigid suspension member for supporting a picture frame by its hanging wire. The lower end of the handle member is connected to the upper end of the suspension member by a pivot. The lower end of the suspension member includes a catch-engaging element for supporting the picture frame by its hanging wire. Directly aligned with the catch-engaging element is a wall-marking element for marking the wall. A deficiency associated with the Karon and Aydelott devices is that they are limited in their use for hanging a picture frame having a hanging wire.

The difficulty associated with hanging a picture frame becomes even more acute when the picture frame is so heavy that it requires two hooks. The difficulty is due at least in part to the fact that the hooks must be carefully located on a wall so that the picture frame hangs level. Devices have been devised for simplifying the task of hanging a picture frame that requires two hooks. For example, U.S. Pat. No. 5,103,573 to Ehling et al. discloses a picture hanging device which includes a ruler-like body having a center post and end posts mounted on its upper edge. Rods are mounted between each end post and the center post. Graduated markings extend the length of the body and a level is attached to a face of the ruler for leveling it. To use the device, a hook is hooked on each rod at a measured distance from the center of the device, the device is located on a wall in a desired position and leveled, and the hooks are nailed to the wall. A deficiency associated with the Ehling et al. device is that it is cumbersome to use. A further deficiency is it cannot be used on a picture frame that does not hang from a hanging wire, e.g., a picture frame that has two or more holes in its rear side.

The difficulties associated with hanging a heavy picture frame on a wall are also found when one attempts to hang a fixture on a wall such as a toilet paper holder, towel rack, and a power strip. More particularly, when a fixture requires at least two attachment points it is difficult to locate the attachment points on the wall so that the fixture hangs level. This problem is exacerbated when the attachment points are "blind holes", i.e., accessible only from the rear of the fixture.

To date there are no devices available for hanging such fixtures and the prior art devices used for hanging picture frames are inadequate for such a purpose. Clearly there is a need for a device that can be used for hanging both picture frames and fixtures (for convenience, they are both referred to hereinafter as fixtures). In addition, there is a need for a device that is not cumbersome to use or complicated to operate.

SUMMARY OF THE INVENTION

The locating device of the present invention includes an elongated body having a rear side and defining a longitudinal axis. A first trammel is mounted on the elongated body for movement along the longitudinal axis and includes a first marker extending from a surface adjacent the rear side of the elongated body at an angle approximately perpendicular to the longitudinal axis. A second trammel is also mounted on the elongated body for movement along the longitudinal axis and includes a second marker extending from a surface adjacent the rear side of the elongated body at an angle approximately perpendicular to the longitudinal axis. The trammels may be retained in position on the elongated body by frictional forces.

A level is mounted on the elongated body and has a predetermined orientation relative to an imaginary line connecting the first marker and the second marker. The orientation may be, for example, zero degrees or ninety degrees. Other angles may be found useful.

In an embodiment of the locating device, a first securing device is mounted to the first trammel and a second securing device mounted to the second trammel (to supplement, or instead of using frictional forces.) The first securing device includes a first insert mounted to the first trammel and a first knob threadingly engaged with the first insert. The second securing device includes a second insert mounted to the second trammel and a second knob threadingly engaged with the second insert. In addition, the first knob may include a first receptacle in which the first marker is removeably received and the second knob may include a second receptacle in which the second marker is removeably received.

The elongated body may also include graduated markings on a side along at least a portion of the body's length. In such case, the first trammel includes a window that aligns with the graduated markings and the second trammel includes a window that aligns with the graduated markings. This arrangement allows for adjusting the trammels at particular measured positions along the elongated body.

The locating device is sufficiently versatile so that a third trammel (or a fourth, fifth, etc.) may be mounted on the elongated body for movement along the longitudinal axis. The third trammel includes a third marker extending from the third trammel adjacent the rear side of the elongated body and at an angle approximately perpendicular to the longitudinal axis. The third trammel may be used when a fixture includes three attachment holes. In the case where the third attachment hole is not in line with the other two, the third marker may be made adjustable with respect to the third trammel.

A method is also disclosed for locating a fixture having attachment points onto a wall. The method includes providing a locating device including an elongated body having a rear side. A first trammel is engaged with the elongated body and has a first marker extending from the trammel in a direction away from the rear side of the body. A second trammel is engaged with the elongated body and has a second marker extending from the trammel in a direction away from the rear side of the body. In addition, a level is mounted on the elongated body and has a predetermined orientation relative to a line connecting the first marker and the second marker.

The first trammel and the second trammel are adjusted into alignment with the attachment points on the fixture. Thereafter, a desired position on the wall where the fixture is to be attached is selected. The leveling device is then positioned at the selected position on the wall and leveled. Marks are made on the wall with the first and second markers. The markers may be of the type, for example, to induce indentations in the wall or to place an ink mark on the wall.

The above described features and other unique features of the leveling device will become more readily apparent from the following description of the preferred embodiments of the invention.

BRIEF DESCRIPTION OF THE DRAWINGS

So that those of ordinary skill in the art which the subject invention appertains will more readily understand how to make and use the invention described herein, preferred embodiments of the invention will be described in detail herein below with reference to the drawings.

DETAILED DESCRIPTION OF THE PREFERRED EMBODIMENTS

Reference is now made to the accompanying Figures for the purpose of describing, in detail, the preferred embodiments of the present invention. Although the description provided hereinbelow concerns particular embodiments and methods of use for the embodiments, those skilled in the art will recognize that other embodiments and uses may be made that are in keeping with the scope of the claims appended hereto.

Figure 1:
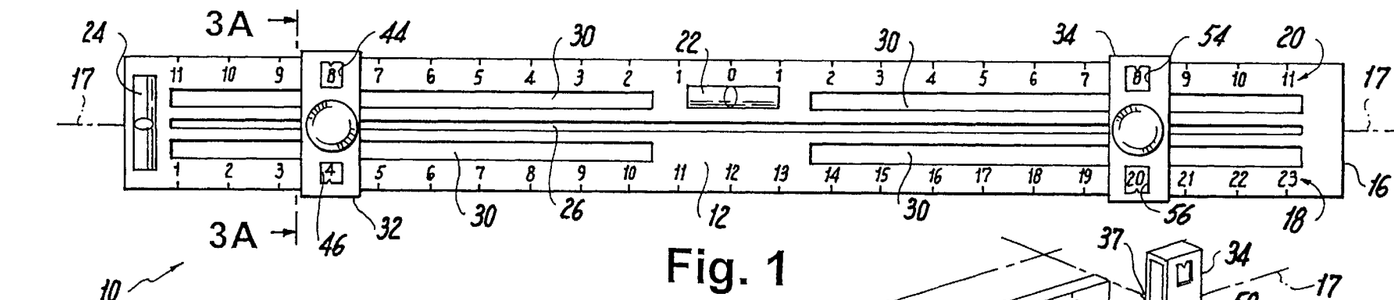
FIG. 1 is a side elevation view of an embodiment of the present invention.

Referring to FIG. 1, an embodiment of the locating device for locating attachment points is illustrated and identified at 10. The locating device 10 may be used by home owners, hotel contractors, phone companies, and carpenters when hanging such fixtures as picture frames, toilet paper holders, towel racks, break-out boxes, and power strips. The types of attachment elements that may be used to attach the fixtures are well known in the art and include such elements as screws, nails, hooks, and lag bolts.

Referring to FIGS. 1–3A, the locating device 10 includes a rectangular body 12 measuring approximately 24 inches (610 mm) long, by 2 inches (51 mm) wide, by ⅜ inch (9.5 mm) high. The body has a first end 14, a second end 16, and a longitudinal axis 17. The body 12 may be made of practically any material including wood, steel, aluminum, brass, or plastic. It may be made by any number of processes including molding, machining, or even stamping.

Figures 2, 3A, 3B:
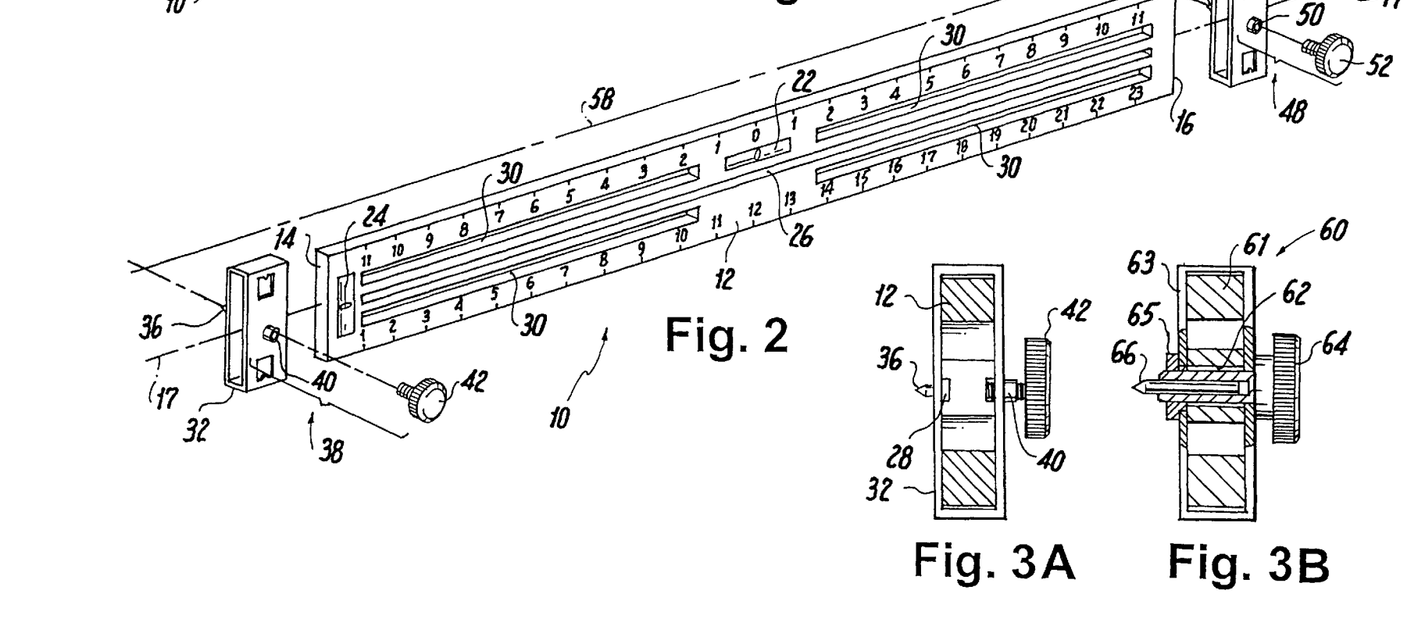
FIG. 2 is an exploded prospective view of an embodiment of the present invention.
FIG. 3A is a cross-sectional view of an embodiment of the present invention, taken along line 3—3 of FIG. 1, illustrating the relationship between a trammel, marking pin, securing device, and an elongated body.
FIG. 3B is a cross-sectional view similar to FIG. 3A, however, illustrating an alternate embodiment of the present invention.

A front surface of the body 12 includes two sets of graduated markings. The first set of graduated markings 18 includes an inch mark every inch from the first end 14 to the second end 16 of the body 12 (1–23 inch markings). The second set of graduated markings 20 includes an inch marking every inch from the center of the body 12 to each of the first end 14 and second end 16 (0–11 inch markings). The graduated markings 18, 20 can be more finely divided into fractional portions of an inch.

The inch markings of the first set of graduated markings 18 align with the inch markings of the second set of graduated markings 20 along the length of the body 12. More specifically, starting from the first end 14 of the body 12, the 1 inch marking of the first set of graduated markings 18 aligns with the 11 inch marking of the second set of graduated markings 20; the 2 inch marking of the first set of graduated markings 18 aligns with the 10 inch marking of the second set of graduated markings 20; etc.

A horizontal level 22 is positioned in a recess proximate the center portion of the body 12 and extends in the lengthwise direction. A plumb level 24 is positioned in a recess proximate the first end 14 of the body and extends in the widthwise direction. The levels 22, 24 may be any type of level that will indicate whether the leveling device is in the level position. For example, the levels 22, 24 may be tubular bubble-type vile levels, tubular ball bearing type vile levels, or electronic levels.

A front channel 26 is formed into the front surface of the body 12 and a rear channel 28 is formed into the back surface of the body 12. The front and rear channels 26, 28 are approximately 22½ inches (572 mm) long, by ⅛ inch (3.2 mm) wide, by 1/16 inch (1.6 mm) deep. Four openings 30, dimensioned approximately 9¾ inch (248 mm) long, by ⅜ inch (9.6 mm) wide, extend in the lengthwise direction of the body 12. Two of the openings 30 are above, and two of the openings 30 are below the channels 26, 28. The openings 30 reduce the weight of the body 12 and provide additional visual access between the front and back surfaces of the body 12.

The locating device 10 includes a first trammel 32 and a second trammel 34 which are configured to slide along the length of, and are lockable to the body 12. The first trammel 32 includes a first marker 36 and a first securing device 38. The first marker 36 is attached to and centered on the back portion the first trammel 32. The first marker 36 includes a pointed end for marking a wall. The securing device 38 includes a female-threaded insert 40 attached to the front portion of the first trammel 32 and a male-threaded knob 42 which is threadingly engaged with the female-threaded insert 40. The male-threaded knob 42 may be adjusted to tighten against the bottom of the front channel 26 to lock it in a desired position. Those skilled in the art should recognize that the threaded insert 40 may be replaced with a thread formed in the first trammel 32.

The first trammel 32 includes an upper indicator window 44 and a lower indicator window 46. Each indicator window 44, 46 includes a pointer for more precisely aligning the first trammel 32 to the body 12. The indicator windows 44, 46 align with each other such that they simultaneously expose the aligned inch-markings on the body 12 as the first trammel 32 is slid lengthwise along the longitudinal axis 17 of the body 12.

The second trammel 34 is substantially similar to the first trammel 32 and includes a second marker 37 and a second securing device 48. The second marker 37 is attached to and centered on the back portion the second trammel 34. The second marker 37 includes a pointed end for marking a wall. The securing device 48 includes a female-threaded insert 50 attached to the front portion of the second trammel 34 and a male-threaded knob 52 which is threadingly engaged with the female-threaded insert 50. The male-threaded knob 52 may be adjusted to tighten against the bottom of the front channel 26 to lock it in a desired position. Those skilled in the art should recognize that the threaded insert 50 may be replaced with a thread formed in the second trammel 52.

The second trammel 34 includes an upper indicator window 54 and a lower indicator window 56. Each indicator window 54, 56 includes a pointer for more precisely aligning the second trammel 34 to the body 12. The indicator windows 54, 56 align with each other such that they simultaneously expose the aligned inch-markings on the body 12 as the second trammel 34 is slid lengthwise along the longitudinal axis 17 of the body 12.

The locating device 10 may include more than two trammels to locate the attachment holes on a fixture that has more than two attachment holes. For example, a third trammel 43 may be mounted on the elongated body 12 for movement along the longitudinal axis 17. The third trammel 43 includes a third marker 45 extending from the third trammel adjacent the rear side of the elongated body 12 and at an angle approximately perpendicular to the longitudinal axis 17. The third trammel 43 may be used when a fixture includes three attachment holes. Furthermore, the trammels may include pins that are offset to account for attachment holes that are offset on the a fixture.

An alternate embodiment of the present invention omits trammels altogether.

More specifically, the alternate embodiment (not shown) includes the body 12 having the first marker 36 and the second marker 37 extending from a rear side thereof, i.e., in a longitudinally fixed position, and the horizontal level 22 and the plumb level 24 mounted to one of the remaining sides. The markers 36, 37 may be made removable for replacement.

The alternate embodiment is particularly useful when a user frequently hangs the same fixture and finds it unnecessary to adjust the distance between the markers 36, 37. This alternate embodiment would be useful, for example, to a telephone serviceman who frequently mounts a certain model junction box or to an electrician that frequently mounts a certain model lighting fixture.

An imaginary line 58 extending from the first marker 36 to the second marker 37 is parallel with the horizontal level 22 so that when the horizontal level 22 shows a level reading, the imaginary line 58 is substantially horizontal. At the same time, the imaginary line 58 is perpendicular to the plumb level 24 so that when the plumb level 24 shows a level reading, the imaginary line 58 is substantially plumb.

An alternate embodiment of the present invention may include a level mounted to the body 12 in a position other than those shown, i.e., parallel and perpendicular to the longitudinal axis 17 of the body 12. For this purpose, the position of a level mounted on the body 12 may be described in terms of the orientation or angle between a working axis of the level and an imaginary line 58 connecting the first marker 36 and the second marker 37. For example, the orientation between the horizontal level 22 and the imaginary line 58 is zero degrees and the orientation between the plumb level 24 and the imaginary line 58 is ninety degrees.

Referring to FIG. 3B, an alternate embodiment of the present invention 60 is illustrated. A rectangular body 61, similar to the rectangular body 12 illustrated in FIGS. 1 and 2, includes an opening 62 instead of the front and rear channels 26, 28. The alternate embodiment 60 includes a first trammel 63 configured to slide along the length of the body 61. The first trammel 63 includes a securing device that includes a threaded knob 64 having a threaded portion which extends through the width of the first trammel 63 and the opening 62 in the body 61, and threads into a threaded insert 65. The threaded insert 65 is preferably attached to the trammel 63 such as by welding or press fitting. The threaded portion of the threaded knob 64 includes a receptacle for receiving a marker 66. The marker 66 may be made removable so that the marker 66 can be exchanged with another marker. The alternate embodiment 60 also includes a second trammel (not shown) that is substantially similar to the first trammel 63.

An alternate embodiment of the present may instead include securing devices that provide a predetermined degree of friction between the trammels and the body 12 so that the trammels do not slide freely along the length of the body 12 without being urged by a user. As another alternative embodiment, the trammels may include securing devices that include spring plungers in contact with detents formed in the body 12. These and other securing devices may be used without departing from the present invention.

The trammels may be made using any number of readily available manufacturing techniques including, for example, sheet metal fabrication, machining, and casting techniques. The trammels may be made of any number of materials including steel, aluminum, or plastic.

The markers 36, 37 shown are solid pins having pointed ends and made of, for example, hardened or stainless steel. Other types of markers may be used. For example, the markers may be felt-tipped markers so that the surface to be marked will not be marred or damaged when a user marks a wall. An example of such a situation is when a user desires to mark the attachment holes for a towel bar on a tiled wall of a bathroom. Other types of markers may be used.

Figure 4:
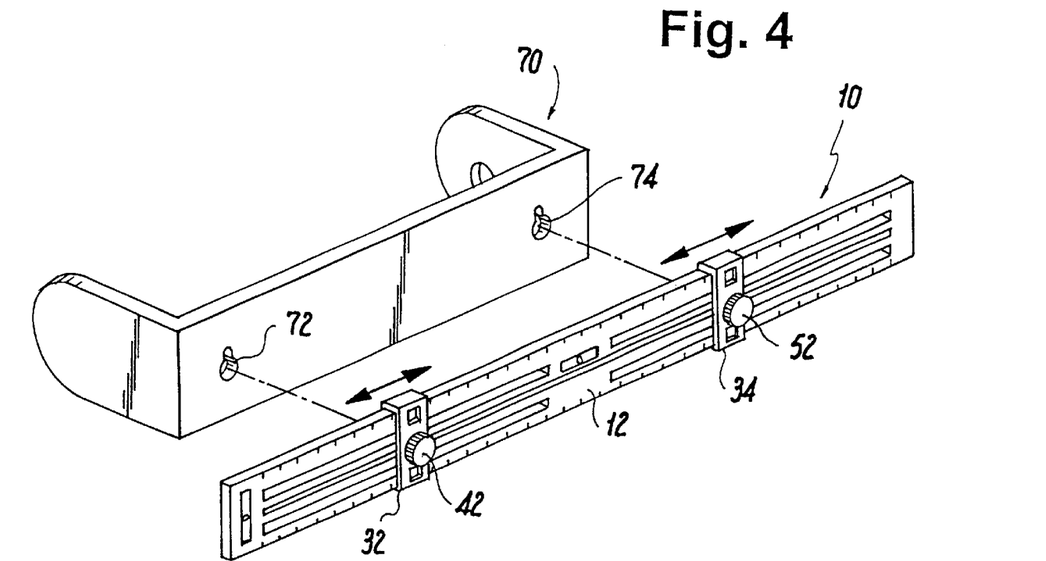
FIG. 4 is a prospective view of an embodiment of the present invention, wherein a user adjusts the trammels to locate attachment holes on a paper roll dispenser.

Referring to FIG. 4, a prospective view of an embodiment of the present invention 10 is shown for obtaining the distance between attachment holes 72, 74 in a paper-roll dispenser 70. Each of the attachment holes 72, 74 are keyhole shaped so that they capture the head of a screw, as is well known in the art. To establish the location of the attachment holes 72, 74, the threaded knobs 42, 52 are loosened and the trammels 32, 34 are adjusted along the body 12 until the markers 36, 37 are aligned with and fall into the respective attachment holes 72, 74 in the dispenser 70. The threaded knobs 42, 52 are tightened to secure them in position.

Those skilled in the art will readily appreciate that devices may have attachment point configurations other than keyhole-shaped holes. For example, attachment points may be round holes or elongated holes. Attachment points may also be captive fasteners (male or female), threaded studs, etc. In such cases, a user may choose to use "markers" having recesses in their ends to receive the fastener. After the position of the attachment holes are taken, the user can switch the markers to, for example, a felt tipped marker to mark a wall.

Figure 5:
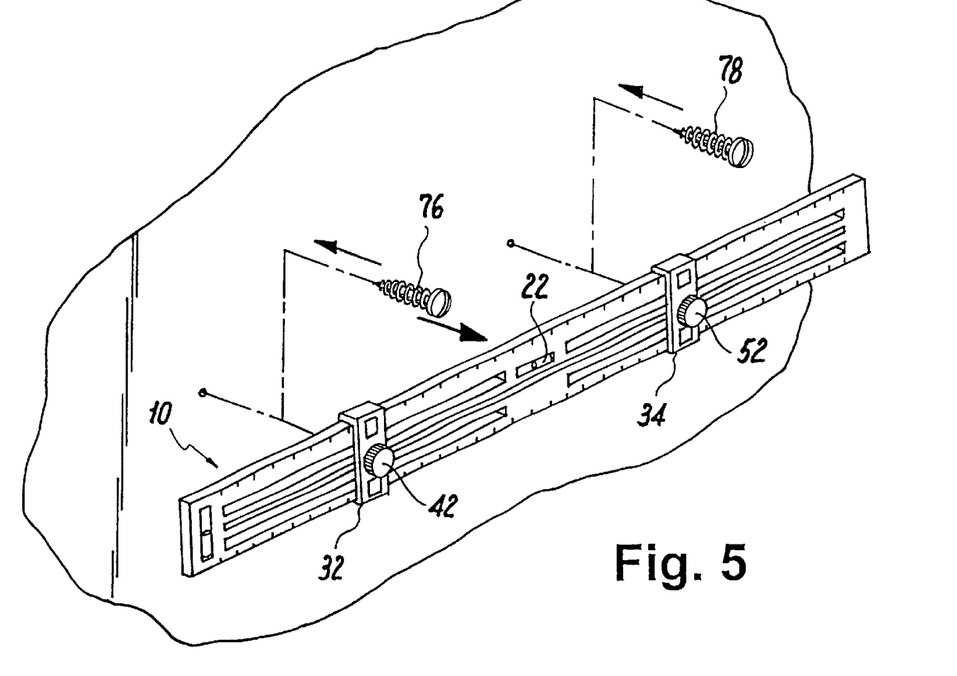
FIG. 5 is a prospective view of the embodiment of the present invention illustrated in FIG. 4, wherein the user transfers the location of the attachment holes of the paper roll dispenser to a wall.

Referring to FIG. 5, the distance between the attachment holes 72, 74 are transferred to a wall as follows. The locating device 10 is positioned against the wall in a desired location. The locating device 10 is leveled using the horizontal level 22 and tapped with a hammer or the palm of the user's hand leaving two small indentations in the wall. The locating device 10 is removed from the wall.

To hang the dispenser 70 on the wall, two pan-head screws 76, 78 are screwed into the wall at the indentations. The heads of the screws 76, 78 are left far enough away from the wall so that they may be received in the attachment holes 72, 74. Thereafter, the dispenser 70 is hung on the screws 76, 78.

Figure 6:
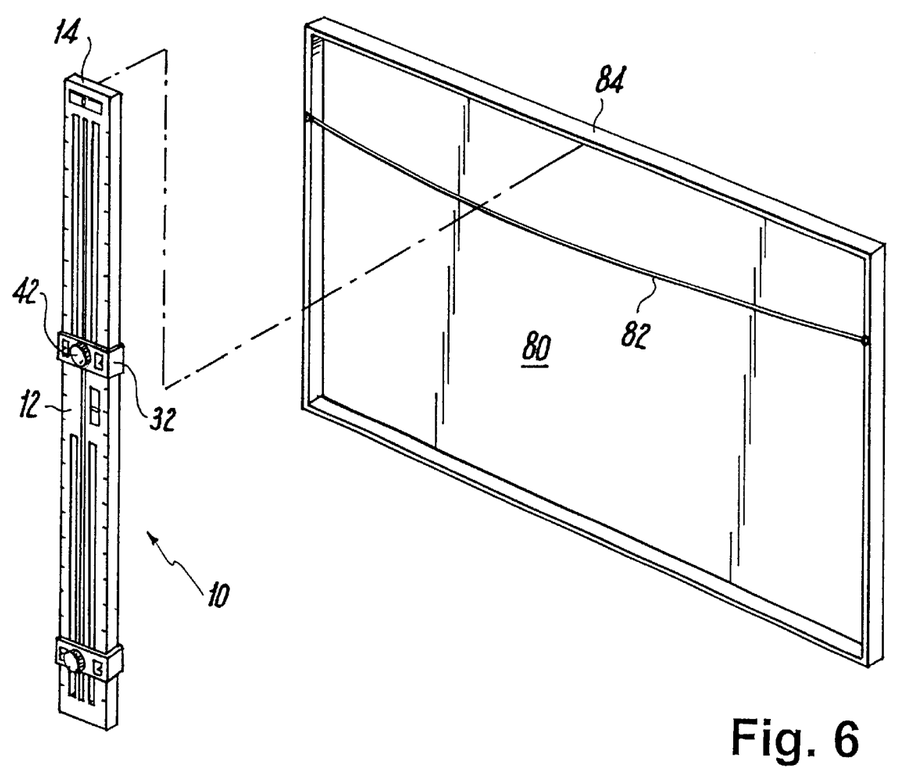
FIG. 6 is a prospective view of an embodiment of the present invention, wherein a user positions the locating device against the back of a picture frame in order to locate the position of an attachment for hanging the picture frame.
Figure 7:
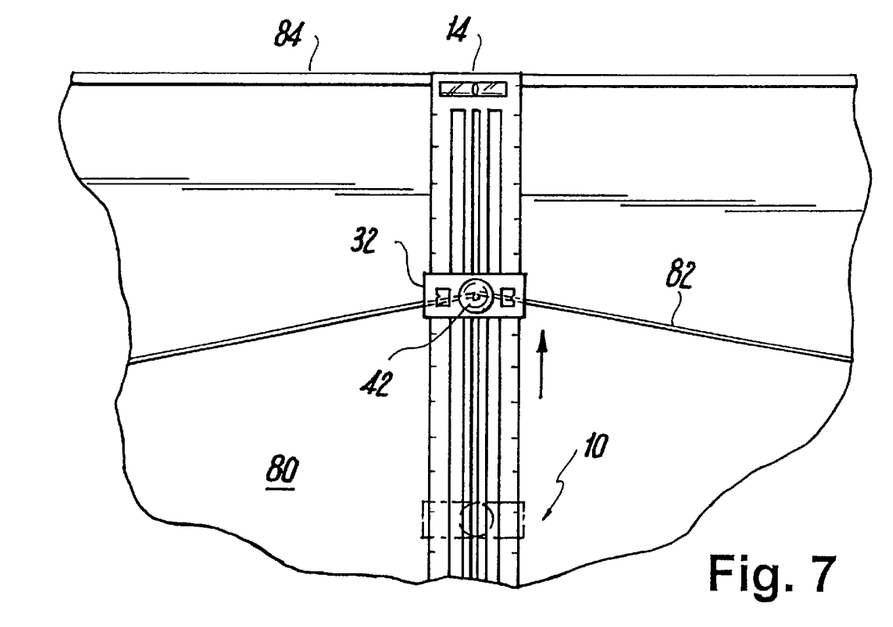
FIG. 7 is a side elevation view of the embodiment of the present invention illustrated in FIG. 6, wherein the user locates the position of an attachment point.

Referring to FIGS. 6 and 7, the locating device 10 may also be used for hanging a picture frame 80 having a hanging wire 82 onto a wall with a single hook. To accurately locate the position of the picture frame 80 on the wall, the first end 14 of the body 12 is positioned flush with a top edge 84 of the picture frame 80. The first threaded knob 42 is loosened and the first trammel 32 is adjusted upwardly along the body 12 until the marker 36 catches the wire 82. After the wire 82 is made taut, the threaded knob 42 is tightened to secure it in position.

Figure 8:
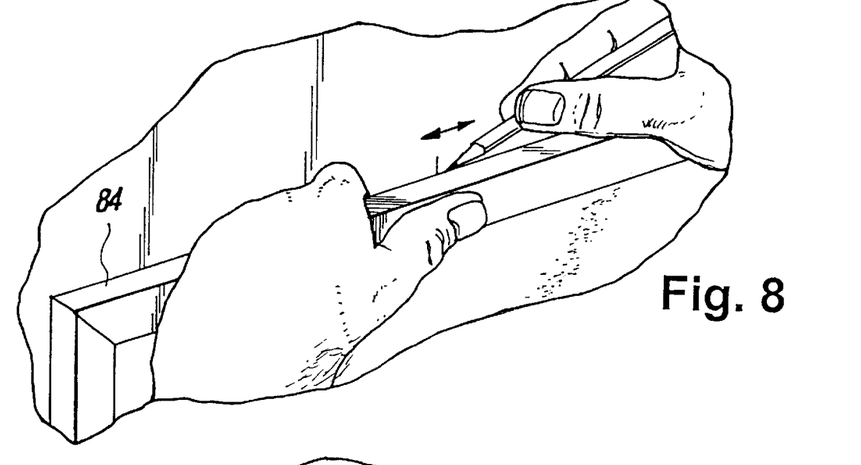
FIG. 8 is a prospective view of the user marking the position of the picture frame on a wall.
Figures 9, 10:
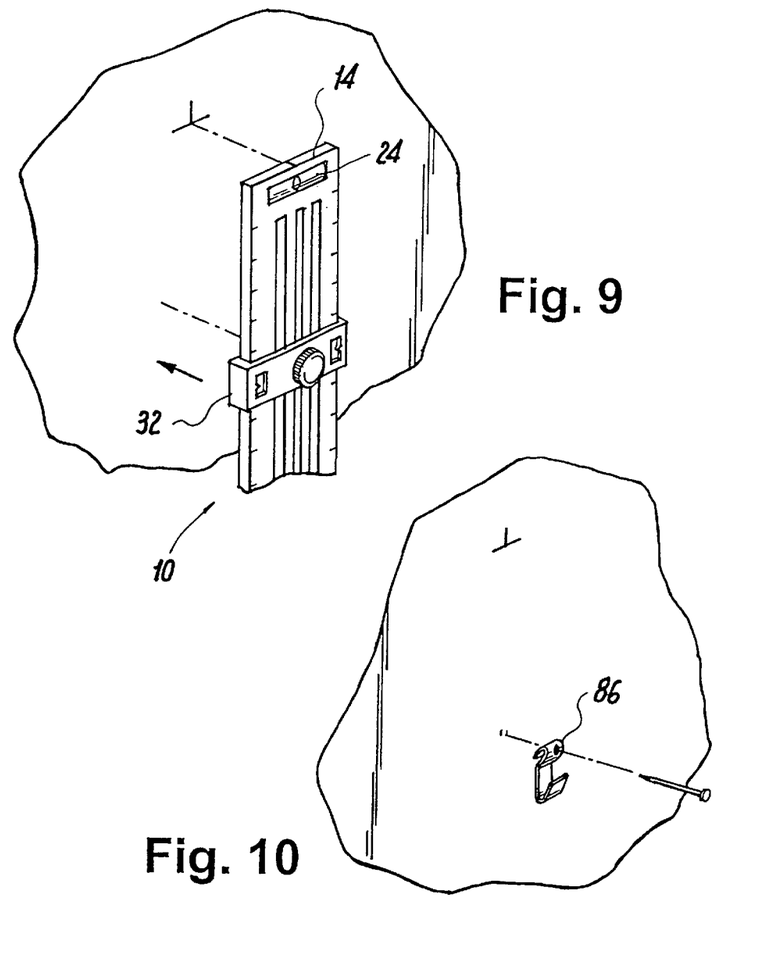
FIG. 9 is a prospective view of the embodiment of the present invention illustrated in FIG. 7, wherein the user transfers the location of the attachment point of the picture frame to the wall.
FIG. 10 illustrates securing a hanger to the wall illustrated in FIG. 9 using the attachment point.

Referring to FIGS. 8–10, the picture frame 80 is held up against the wall in a favorable location and the top-center position of the picture frame 80 is marked with a pencil mark on the wall. The locating device 10 is held against the wall with the first end 14 facing upward and the plumb level 24 reading level. The center of the first end 14 of the locating device is aligned with the pencil mark on the wall. The locating device 10 is tapped with a hammer or the palm of the user's hand leaving a small indentation in the wall. The locating device 10 is removed from the wall, a hook 86 is nailed to the wall where the indentation was made, and the picture frame 80 is hung by its wire 82 on the hook 86.

Figure 11:
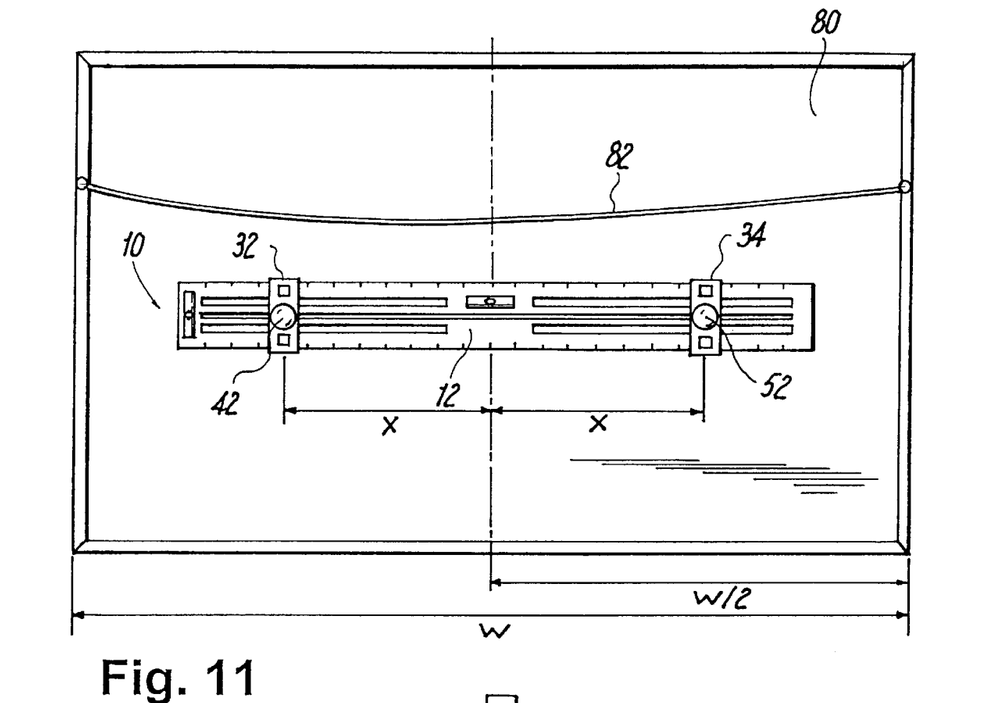
FIG. 11 is a side elevation view of an embodiment of the present invention, wherein a user positions a locating device against the back of a picture frame in order to locate the position of attachment points for hanging the frame.
Figure 12:
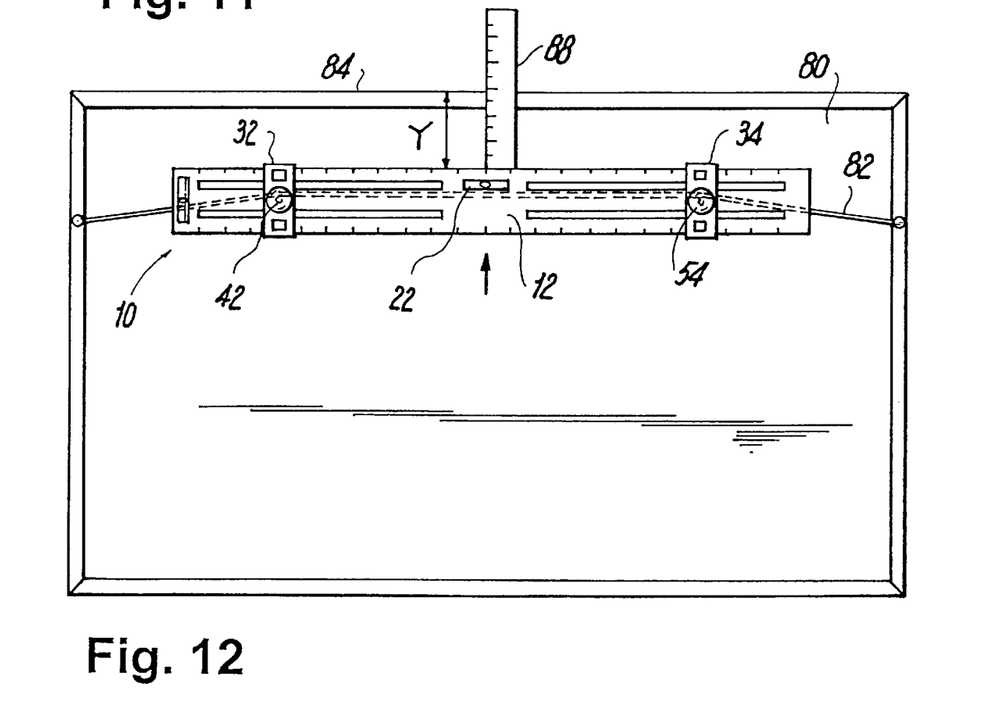
FIG. 12 is a side elevation view of the embodiment of the present invention illustrated in FIG. 11, wherein a user positions the locating device against the back of the picture frame.

Referring to FIGS. 11 and 12, the locating device 10 may also be used for hanging a picture frame 80 having a hanging wire 82 onto a wall with a pair of hooks. To accurately locate the position of the picture frame 80 on the wall, the threaded knobs 42, 52 are loosened and the trammels 32, 34 are adjusted so the distance between them equals, for example, one-half the width of the picture frame 10. A general equation for locating the trammels is as follows: $X=W/4$; where X is the distance from the center of the body 12. For example, if the picture frame 10 is thirty-two inches wide, the trammels 32, 34 are each positioned so that their markers 36, 37 are eight inches from the center of the picture frame 80. The second set of graduated markings 20 may be used to locate the trammels 32, 34. With the trammels 32, 34 in position, the threaded knobs 42, 52 are tightened to secure them in position.

The locating device 10 is positioned against the back of, and parallel with the top edge 84 of the picture frame 80, and moved upwardly so that the markers 36, 37 catch the wire 82. After the wire 82 is made taut, a measurement Y is taken from the top edge 84 of the picture frame 80 to the top of the locating device 10 using a ruler 88.

Figure 13:
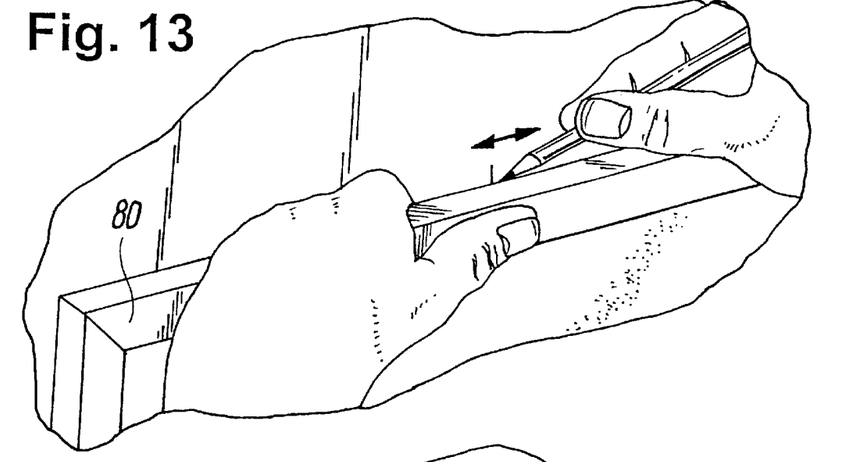
FIG. 13 is a prospective view of the user marking the position of the picture frame on a wall.
Figure 14:
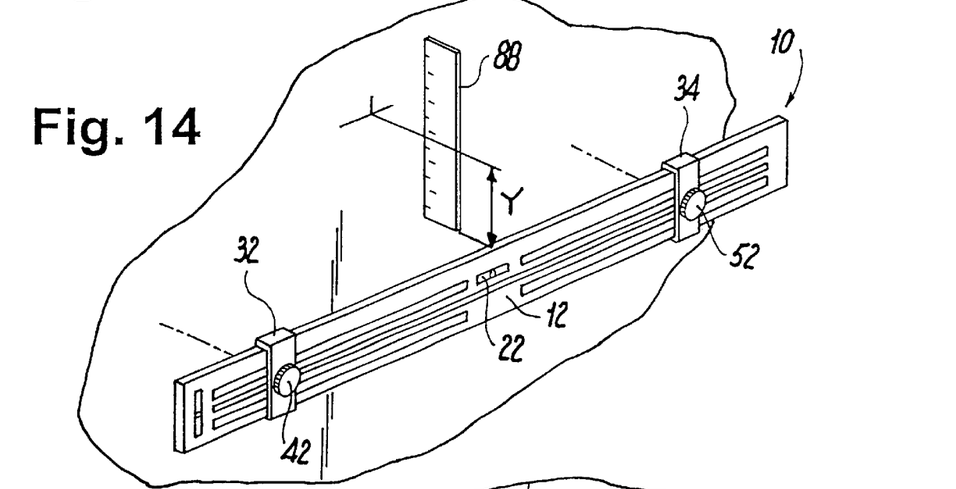
FIG. 14 is a prospective view of the embodiment of the present invention illustrated in FIG. 12, wherein the user transfers the location of the attachment points of the picture frame to the wall.
Figure 15:
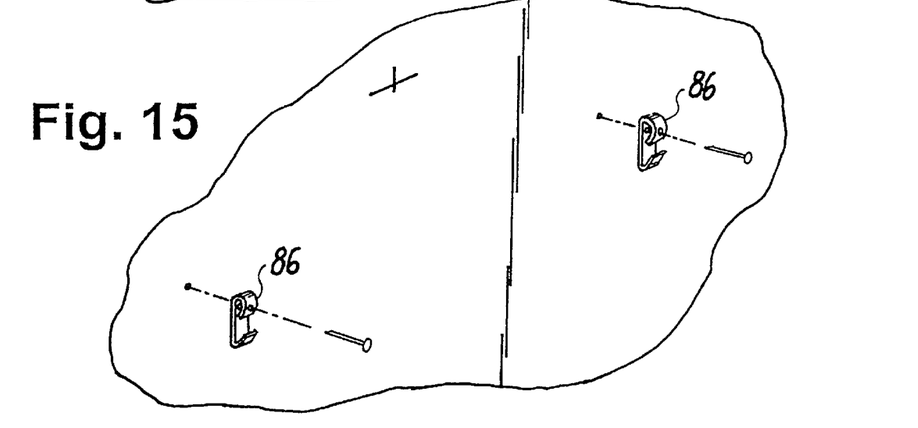
FIG. 15 illustrates securing a pair of hangers to the wall illustrated in FIG. 14 using the attachment points.

Referring to FIGS. 13–15, the picture frame 80 is held up against the wall in a favorable location and the top-center position of the picture frame 80 is marked with a pencil mark on the wall. The locating device 10 is held against the wall with its top edge facing upward and the horizontal level 22 leveled. Using the ruler 88, the center of the body 12, i.e., the zero inch (0") mark of the second set of graduated markings 20, is aligned with the pencil mark and the locating device 10 is shifted down the measurement Y that was earlier measured between the top edge 84 of the picture frame 80 and the top of the locating device 10. With the horizontal level 22 still reading level, the locating device 10 is tapped with a hammer or the palm of the user's hand leaving two small indentations in the wall. The locating device 10 is removed from the wall, hooks 86 are nailed to the wall where the indentations were made, and the picture frame 80 is hung by its wire 82 on the hooks 86.

The locating device 10 is clearly a useful and versatile device that can be used in a multitude of settings where fixtures are to be hung or attached to a wall. The locating device 10 eliminates the disadvantages of all prior art devices in that it can be used for hanging a variety of types of fixtures, it is not complicated to operate, nor is it cumbersome to use.

Although the locating device 10 of the present invention has been described with respect to preferred embodiments, it is apparent that modifications and changes can be made thereto without departing from the spirit and scope of the invention as defined by the appended claims.

What is claimed is:

1. A locating device comprising:
   an elongated body having a front side that includes first and second sets of graduated markings and a rear side, said first set of graduated markings corresponding to distances from a first point of reference, said second set of graduated markings corresponding to distances from a second point of reference, and said elongated body defining a longitudinal axis;

a first trammel movably mounted on said elongate body, said first trammel including a first marker extending from the rear side of the elongated body at an angle approximately perpendicular to the longitudinal axis and a first pair of indicator windows aligned with said first marker, said first pair of indicator windows permitting viewing of said first and second sets of graduated markings;

a second trammel movably mounted on said elongate body, said second trammel including a second marker extending from the rear side of the elongated body at an angle approximately perpendicular to the longitudinal axis and a second pair of indicator windows aligned with said second marker, said second pair of indicator windows permitting viewing of said first and second set of graduated markings; and a level supported by the elongated body and having a predetermined orientation relative to a line connecting the first marker and the second marker.

2. A locating device as recited in claim 1, wherein the predetermined orientation relative to the line connecting the first marker and the second marker is a zero degree angle.

3. A locating device as recited in claim 1, wherein the second marker and the first marker are removeable.

4. A locating device comprising:

an elongated body having a front side that includes first and second sets of graduated markings and a rear side, said first set of graduated markings corresponding to distances from a first point of reference, said second set of graduated markings corresponding to distances from a second point of reference, and said elongated body defining a longitudinal axis;

a first trammel mounted on the elongated body for movement along the longitudinal axis, said first trammel including a first pair of indicator windows permitting viewing of said first and second sets of graduated markings;

a first marker extending from the first trammel adjacent the rear side of the elongated body at an angle approximately perpendicular to the longitudinal axis, said first marker being aligned with said first pair of indicator windows;

a second trammel mounted on the elongated body for movement along the longitudinal axis, said second trammel including a second pair of indicator windows permitting viewing of said first and second sets of graduated markings;

a second marker extending from the second trammel adjacent the rear side of the elongated body at an angle approximately perpendicular to the longitudinal axis, said second marker being aligned with said second pair of indicator windows; and a level supported by the elongated body and having a predetermined orintation relative to a line connecting the first marker and the second marker.

5. A locating device as recited in claim 4, wherein the predetermined orientation relative to the line connecting the first marker and the second marker is a zero degree angle.

6. A locating device as recited in claim 4, further including a first securing device mounted to the first trammel and a second securing device mounted to the second trammel.

7. A locating device as recited in claim 6, wherein the first securing device includes a first insert mounted to the first trammel and a first knob threadingly engaged with the first insert, and the second securing device includes a second insert mounted to the second trammel and a second knob threadingly engaged with the second insert.

8. A locating device as recited in claim 7, wherein the first knob includes a first receptacle in which the first marker is received and the second knob includes a second receptacle in which the second marker is received.

9. A locating device as recited in claim 4, further including a third trammel mounted on the elongated body for movement along the longitudinal axis and a third marker extending from the third trammel adjacent the rear side of the elongated body at an angle approximately perpendicular to the longitudinal axis.

10. A locating device as recited in claim 9, wherein the third marker is adjustable with respect to the first and second trammels.

11. A method for locating a fixture having attachment point onto a wall comprising:

providing a locating device including an elongated body having a front side that includes first and second sets of graduated markings, a rear side, a first trammel engaged with the elongated body and having a first marker extending from the trammel away from the rear side and a first pair of indicator windows aligned with said first marker, said first set of graduated markings corresponding to distances from a first point of reference, said second set of graduated markings corresponding to distances from a second point of reference, and said first pair of indicator windows permitting viewing of said first and second set of graduated markings, a second trammel engaged with the elongated body and having a second marker extending from the trammel away from the rear side and a second pair of indicator windows aligned with said second marker, said second pair of indicator windows permitting viewing of said first and second set of graduated markings, and a level supported by the elongated body and having a predetermined orientation relative to a line connecting the first marker and the second marker;

adjusting the first trammel and the second trammel into alignment with the attachment points;

viewing at least one of said first and second set of graduated markings through said first and second pairs of indicator windows;

determining an attachment position on a wall where the fixture is to be located;

positioning the locating device in the attachment position;

leveling the locating device using the level; and marking the wall with the first and second markers.

12. A method as recited in claim 11, further including the step of securing the first trammel and the second trammel to the elongated body after the trammels are in alignment with the attachment points.

13. A method as recited in claim 11, wherein the step of marking the wall with the first and second markers includes the step of tapping the locating device with an object to produce indentations in the wall.

14. In a locating device that includes an elongated body defining a first axis and having a first set of graduated markings corresponding to distances from a first point of reference on at least one side thereof, and first and second trammels movably mounted on said elongated body, the improvement comprising:

a) a marker extending from each of said first and second trammels, each marker extending along a second axis substantially perpendicular to said first axis;
b) a second set of graduated markings carresponding to distances from a second point of reference on said at least one side of said elongated body; and
c) a pair of indicator windows formed in each of said first and second trammels, each of said pair of indicator windows being aligned with the marker extending from the trammel, said pairs of indicator windows permitting viewing of said first and second sets of graduated markings on said elongated body.

15. A locating device according to claim 14, further comprising a level supported by said elongated body.

* * * * *